US009485348B2

(12) United States Patent
Jeong et al.

(10) Patent No.: US 9,485,348 B2
(45) Date of Patent: Nov. 1, 2016

(54) MOBILE TERMINAL AND COMMUNICATION METHOD THEREOF

(75) Inventors: Chang-Ik Jeong, Seoul (KR); Jae-Sung Shim, Seoul (KR); Young-Hee Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1564 days.

(21) Appl. No.: 12/701,450

(22) Filed: Feb. 5, 2010

(65) Prior Publication Data

US 2010/0203908 A1    Aug. 12, 2010

(30) Foreign Application Priority Data

Feb. 9, 2009    (KR) .................. 10-2009-0010321

(51) Int. Cl.
*G06F 3/048* (2013.01)
*H04M 1/725* (2006.01)
*G06F 3/0486* (2013.01)
*G06F 3/0488* (2013.01)

(52) U.S. Cl.
CPC ........ *H04M 1/72552* (2013.01); *G06F 3/0486* (2013.01); *G06F 3/04883* (2013.01)

(58) Field of Classification Search
USPC .................................................. 715/753, 772
See application file for complete search history.

(56) References Cited

U.S. PATENT DOCUMENTS

| | | | | |
|---|---|---|---|---|
| 6,981,223 B2 * | 12/2005 | Becker | ................. | G06F 3/0481 715/753 |
| 7,519,386 B2 * | 4/2009 | Kespohl et al. | ........... | 455/550.1 |
| 7,844,662 B2 * | 11/2010 | Malik | ......................... | 709/204 |
| 2004/0078444 A1* | 4/2004 | Malik | ................. | G06Q 10/107 709/206 |
| 2005/0131765 A1* | 6/2005 | Rivera | ................... | G06Q 30/02 705/80 |
| 2006/0059160 A1* | 3/2006 | Smola | ............... | G06F 17/30861 705/319 |
| 2006/0174207 A1* | 8/2006 | Deshpande | .......... | G06Q 10/107 715/758 |
| 2007/0288560 A1* | 12/2007 | Bou-Ghannam et al. | .... | 709/204 |

FOREIGN PATENT DOCUMENTS

KR    10-2004-0045189    6/2004
KR    10-2008-0003983    1/2008

OTHER PUBLICATIONS

Korean Intellectual Property Office Application Serial No. 10-2009-0010321, Office Action dated Feb. 6, 2015, 6 pages.

* cited by examiner

*Primary Examiner* — Jeffrey A Gaffin
*Assistant Examiner* — Justin Lee
(74) *Attorney, Agent, or Firm* — Lee, Hong, Degerman, Kang & Waimey

(57) ABSTRACT

A mobile terminal includes a wireless communication unit establishing a first communication session with a first entity and a second communication session with a second entity, a display displaying a plurality of windows including a first window and a second window, a memory storing a merging menu, and a controller controlling the display to display the first window related to the first communication session and the second window related to the second communication session, the controller generating a third window including the first communication session and the second communication session in response to a an input and controlling the display to display the third window further including the first entity and the second entity.

36 Claims, 14 Drawing Sheets

Merging items

1. Conversation window merging
2. Session merging (Display user B on uppermost part of conversations)

(Display conversation list)

MOBILE TERMINAL AND COMMUNICATION METHOD THEREOF

CROSS-REFERENCE TO A RELATED APPLICATION

Pursuant to 35 U.S.C. §119(a), this application claims the benefit of earlier filing date and right of priority to Korean Application No. 10-2009-0010321, filed on Feb. 9, 2009, the content of which is incorporated by reference herein in its entirety.

FIELD OF THE INVENTION

The present disclosure relates to a mobile terminal and a method of communicating using the mobile terminal. In particular, the method involves managing multi-sessions performed by the mobile terminal.

BACKGROUND OF THE INVENTION

In general, a mobile terminal is configured to perform various functions. For example, these various functions include video and voice call communications, capturing still or moving images using a camera, storing audio data or voice and images, reproducing music file through a speaker system, and displaying image or video. Some mobile terminals include additional functions such as games and also function as multimedia players.

Moreover, recently, mobile terminals are configured to output video or television programs by receiving broadcast or multicast signals.

Various attempts have been made to implement enhanced functions of the mobile terminal not only by structural improvements, but also by hardware or software improvements. For example, a touch input function of the mobile terminal allows a user to conveniently operate the mobile terminal by using a touch screen. Recently, the touch input function is considered as an important function of the mobile terminal along with a simple input method with User Interface (UI).

Generally, an IP (Internet Protocol) multimedia system provides a PTT (Push-to-talk) over Cellular (PoC) service which is a Session Initiation Protocol (SIP)-based voice service and an Instant Messaging (IM) service which is a text-based service. The PoC service indicates a service for creating and managing a session by using an SIP on the basis of a PoC server and transmitting media, such as voice, video, images and files, through a Real-time Transport Protocol (RTP). The IM service indicates a service for inserting text into a body of an SIP message and transmitting the text through a PoC server or an additional IM server.

The IM service, which is a service for real-time communication, such as chatting or telephony, is frequently used to transmit simple messages, such as memos, files, and data, to users who are in an online status on the Internet or IP in real-time. Once a user transmits a message, the message is immediately output to a screen of a party receiving the message. Accordingly, the IM service allows a message to be transmitted or received in real-time on a wired or wireless network and also allows to immediately check whether the message has been received or not.

In order to use the IM service, each subscriber is required to install an IM program at a communication device, such as computer or mobile terminal, and to register a buddy list consisting of contact-permitted parties or friends. Once the user starts a conversation with another party, one session is created and conversation content is transmitted through the created session.

Accordingly, if the user conducts conversations with a plurality of parties in multiple sessions, a plurality of conversation windows corresponding to the number of the multiple sessions are created on a screen of the mobile terminal such that the user can engage in conversation with a desired party among the plurality of parties by individually selecting one of the plurality of conversation windows on which the desired party is displayed. This will cause the user inconvenience and the UI (User Interface) function of the mobile terminal may become limited due to display of the plurality of conversation windows on the limited space of the screen.

The IM (Instant Messaging) service is a technique for implementing a messenger function in a mobile terminal. However, the conventional IM service has problems when performed in the mobile terminal.

If the user is engaged in conversation with a plurality of parties at the same time while using an IM service, a plurality of conversation windows corresponding to the number of the plurality of parties are created on the screen of the mobile terminal. Thus, the user needs to switch between each of the plurality of conversation windows to engage in conversation with a particular one of the plurality of parties by individually selecting one of the conversation windows on a small screen of the mobile terminal.

Therefore, there is a need for improving the above mentioned problem with regard to performing a plurality of IM conversation sessions or opening a plurality of conversation window corresponding to the plurality of IM conversation sessions in a limited space of the mobile terminal.

SUMMARY OF THE INVENTION

Therefore, an object of the present disclosure is to provide a mobile terminal capable of allowing a user to conduct conversation with a plurality of parties through one conversation window by using a messenger function, and a method of managing multi sessions performed by the mobile terminal.

According to an embodiment of the present invention, a method of communicating with a plurality of entities in a mobile terminal includes initiating a first communication session with a first entity, generating a first window related to the first communication session, initiating a second communication session with a second entity, generating a second window related to the second communication session, generating a third window in response to a first input, and displaying the third window including the first entity and the second entity.

According to another embodiment of the present invention, a mobile terminal includes a wireless communication unit configured to establish a first communication session with a first entity and a second communication session with a second entity, a display configured to display a plurality of windows, a memory configured to store a merging menu, and a controller configured to control the display to display a first window related to the first communication session and a second window related to the second communication session, to generate a third window comprising the first communication session and the second communication session executed independently of each other in response to an input, and to control the display to display the third window including the first entity and the second entity.

According to yet another embodiment of the present invention, a method of communicating in a mobile terminal includes establishing a first communication session with a first entity, generating a window comprising the first communication session, displaying the first communication session on the window, establishing a second communication session in response to an input for communicating with a second entity, displaying the second communication session with the first communication session on the window, and performing the first communication session and the second communication session independently on the window.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

The above and other aspects, features, and advantages of the present invention will become more apparent upon consideration of the following description of preferred embodiments, taken in conjunction with the accompanying drawings.

Hereinafter, a mobile terminal according to an embodiment of the present invention will be explained in more detail with reference to the attached drawings. The suffixes attached to components of the wireless speaker, such as "module" and "unit" or "portion" were used for facilitation of the detailed description of the present invention. Therefore, the suffixes do not have different meanings from each other.

A terminal may be implemented in various types. For example, the terminal in the present disclosure includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV and a desktop computer. While it is assumed that the terminal of the present disclosure is a mobile terminal, it will be obvious to those skilled in the art that the present invention may be also applicable to the fixed terminal, except for specific configurations for mobility.

Figure 1:
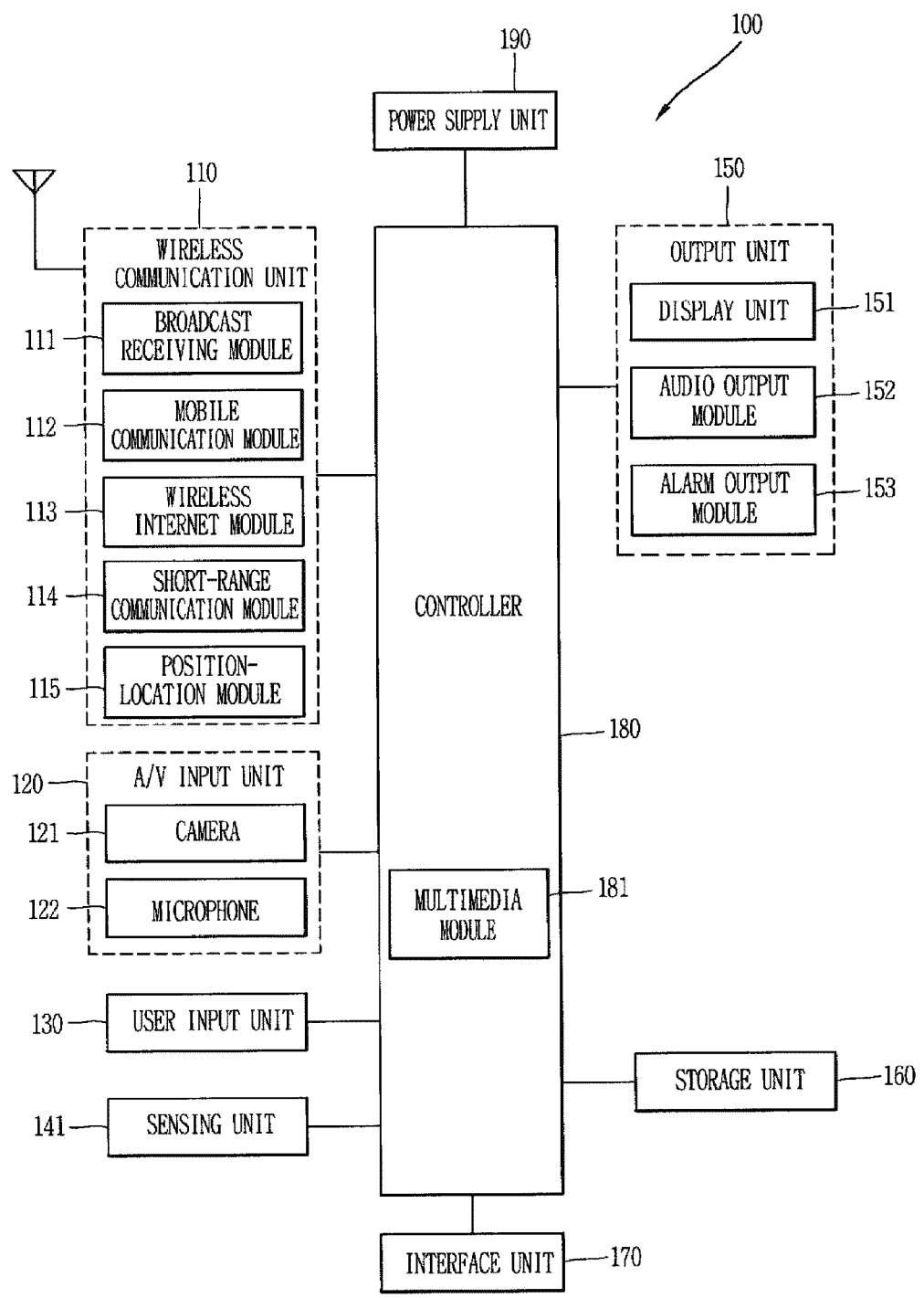
FIG. 1 is a block diagram of a mobile terminal according to an embodiment of the present invention.

Referring to FIG. 1, a mobile terminal 100 according to an embodiment of the present invention includes a wireless communication unit 110 that includes one or more components and permits wireless communication between the mobile terminal 100 and a wireless communication system or network within which the mobile terminal is located. For example, the wireless communication unit 110 includes a broadcast receiving module 111 that receives a broadcast signal and/or broadcast associated information from an external broadcast managing entity via a broadcast channel. The broadcast channel may include a satellite channel or a terrestrial channel.

The broadcast managing entity generally refers to a system which transmits a broadcast signal and/or broadcast associated information. Examples of broadcast associated information include information associated with a broadcast channel, a broadcast program, and a broadcast service provider. For example, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a storage unit 160.

The wireless communication unit 110 also includes a mobile communication module 112 that transmits/receives wireless signals to/from one or more network entities, such as base station or Node-B. Such signals may represent audio, video, multimedia, control signaling, and data, among others.

Also included is a wireless Internet module 113 that supports Internet access for the mobile terminal 100. The wireless Internet module 113 may be internally or externally coupled to the mobile terminal 100.

The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as BLUETOOTH® and ZIGBEE®, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown in FIG. 1, the A/V input unit 120 includes a camera module 121 and a microphone module 122. If desired, two or more microphone modules 122 and/or camera modules 121 may be used. The camera module 121 receives and processes image frames of still pictures or video.

Further, the microphone module 122 receives an external audio signal while the mobile device is in a particular mode, such as a phone call mode, recording mode and voice recognition mode. The received audio signal is then processed and converted into digital data.

Also, the portable device, and in particular, the A/V input unit 120, includes assorted noise removing algorithms to remove noise generated in the course of receiving the external audio signal. In addition, data created by the A/V input unit 120 may be stored in the storage unit 160, utilized by an output unit 150, or transmitted via one or more modules of the communication unit 110.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, presence or absence of user contact with the mobile terminal 100, and orientation or acceleration/deceleration of the mobile terminal 100.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply unit 190, the presence or absence of a coupling or other connection between an interface unit 170 and an external device.

Further, the interface unit 170 is often implemented to couple the mobile terminal 100 with external devices. Typical external devices include wired/wireless headphones, external chargers, power supplies, storage devices configured to store data, such as audio, video, and pictures, earphones, and microphones, among others. In addition, the interface unit 170 may be configured using a wired/wireless data port, a card socket (e.g., for coupling to a memory card, a subscriber identity module (SIM) card, a user identity module (UIM) card, or a removable user identity module (RUIM) card), audio input/output ports and video input/output ports.

The output unit 150 generally includes various components which support the output requirements of the mobile terminal 100. The output unit 150 includes a display module 151 that visually displays information associated with the mobile terminal 100.

For example, if the mobile terminal 100 is operating in a phone call mode, the display module 151 will generally provide a user interface or graphical user interface which includes information associated with placing, conducting, and terminating a phone call. As another example, if the mobile terminal 100 is in a video call mode or a photographing mode, the display module 151 may additionally or alternatively display images which are associated with these modes.

Further, the display module 151 also preferably includes a touch screen working in cooperation with an input device, such as a touchpad. This configuration permits the display module 151 to function both as an output device and an input device. In addition, the display module 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 may be implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm output module 153, which is used to signal or otherwise identify the occurrence of a particular event associated with the mobile terminal 100. Alarm events include a call received, a message received and user input received.

An example of such output includes the providing of tactile sensations (e.g., vibration) to a user. For example, the alarm output module 153 may be configured to vibrate responsive to the mobile terminal 100 receiving a call or message.

As another example, a vibration is provided by the alarm output module 153 responsive to receiving user input at the mobile terminal 100, thus providing a tactile feedback mechanism. Further, the various outputs provided by the components of the output unit 150 may be separately performed, or such output may be performed using any combination of such components.

In addition, the storage unit 160 is used to store various types of data to support the processing, control, and storage requirements of the mobile terminal 100. Examples of such data include program instructions for applications operating on the mobile terminal 100, call history, contact data, phonebook data, messages, pictures, and video.

Further, the storage unit 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For example, the controller 180 performs the control and processing associated with voice calls, data communications, instant message communications, video calls, camera operations and recording operations.

As shown in FIG. 1, the controller 180 may also include a multimedia module 181 for providing multimedia playback functions. The multimedia module 181 may be configured as part of the controller 180, or may be implemented as a separate component.

In addition, a power supply unit 190 provides power used by the various components for the mobile terminal 100. The provided power may be internal power, external power, or combinations thereof.

Figure 2:
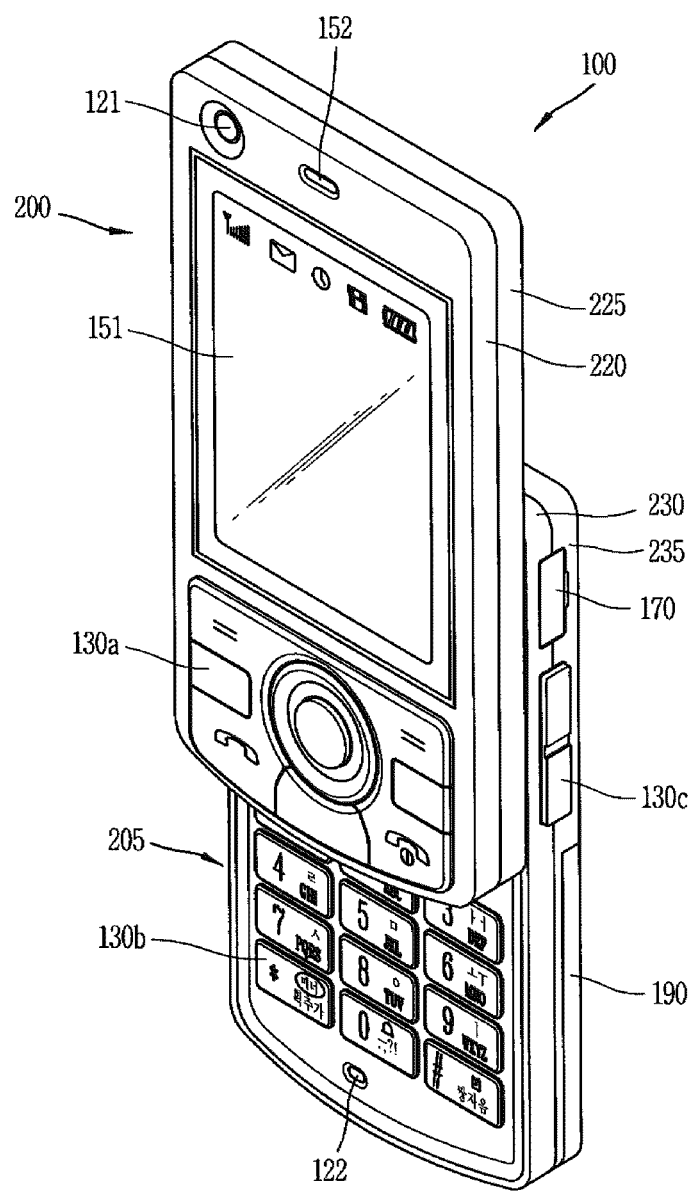
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slidably cooperate with a second body 205. The user input unit 130 described in FIG. 1 may include a first input unit such as function keys 130a, a second input unit such as a keypad 130b, and a third input unit such as side keys 130c.

The function keys 130a are associated with the first body 200, and the keypad 130b is associated with the second body 205. The keypad 130c includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 130c is substantially or completely obscured by the first body 200. In the open position, user access to the keypad 130c, as well as the display module 151 and function keys 130a, is possible. The function keys 130a are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases 220, 225 of the first body 200 or between the first and second cases 230, 235 of the second body 205. In addition, the first and second bodies 200 and 205 are sized to receive electronic components used to support the operation of the mobile terminal 100.

Also, the first body 200 includes the camera module 121 and the audio output module 152, which is configured as a speaker, positioned relative to the display module 151. The camera module 121 may also be constructed such that it can be selectively positioned relative to the first body 200, for example, by being rotated or swiveled.

Further, the function keys 130a are positioned adjacent to a lower side of the display module 151. As discussed above, the display module 151 can be implemented as an LCD or OLED. The display module 151 may also be configured as a touch screen having an underlying touchpad which generates signals responsive to user contact by a finger or stylus with the touch screen.

Also, the second body 205 includes the microphone module 122 positioned adjacent to the keypad 130b, and side keys 130c, which are one type of a user input unit 130, positioned along the side of the second body 205. Preferably, the side keys 130c are configured as hot keys such that the side keys are associated with a particular function of the mobile terminal 100. As shown, the interface unit 170 is positioned adjacent to the side keys 130c and the power supply 190 in a form of a battery is located on a lower portion of the second body 205.

Figure 3:
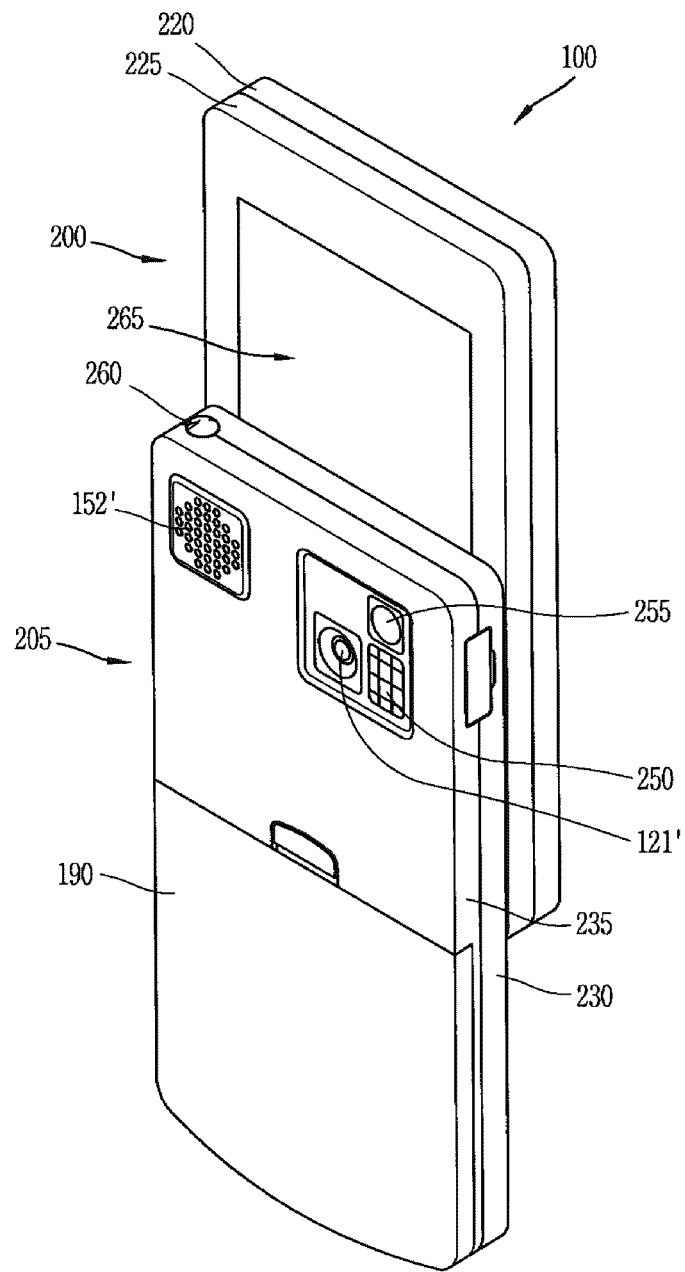
FIG. 3 is a rear perspective view of the mobile terminal shown in FIG. 2.

FIG. 3 is a rear side view of the mobile terminal 100 shown in FIG. 2. As shown in FIG. 3, the second body 205 includes a second camera module 121', and an associated flash 250 and mirror 255. The flash 250 operates in conjunction with the second camera module 121' of the second body 205, and the mirror 255 is useful for assisting a user to position the second camera module 121' in a self-portrait mode. In addition, the second camera module 121' of the second body 205 faces a direction which is opposite to a direction faced by the camera module 121 of the first body 200 shown in FIG. 2.

In addition, each of the camera modules 121 and 121' of the first and second bodies 200 and 205 may have the same or different capabilities. For example, in one embodiment, the camera module 121 of the first body 200 operates with a relatively lower resolution than the second camera module 121' of the second body 205. Such an arrangement works well during a video conference call, for example, in which reverse link bandwidth capabilities may be limited. Further, the relatively higher resolution of the second camera module 121' of the second body 205 is useful for obtaining higher quality pictures for later use.

The second body 205 also includes a second audio output module 152' which is configured as a speaker and located on an upper side of the second body 205. The audio output modules 152 and 152' of the first and second bodies 200 and 205 may also cooperate together to provide stereo output. Moreover, either or both of these audio output modules 152 and 152' may be configured to operate as a speakerphone.

The mobile terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205.

Further, the rear side of the first body 200 includes a slide module 265. The slide module 265 slidably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
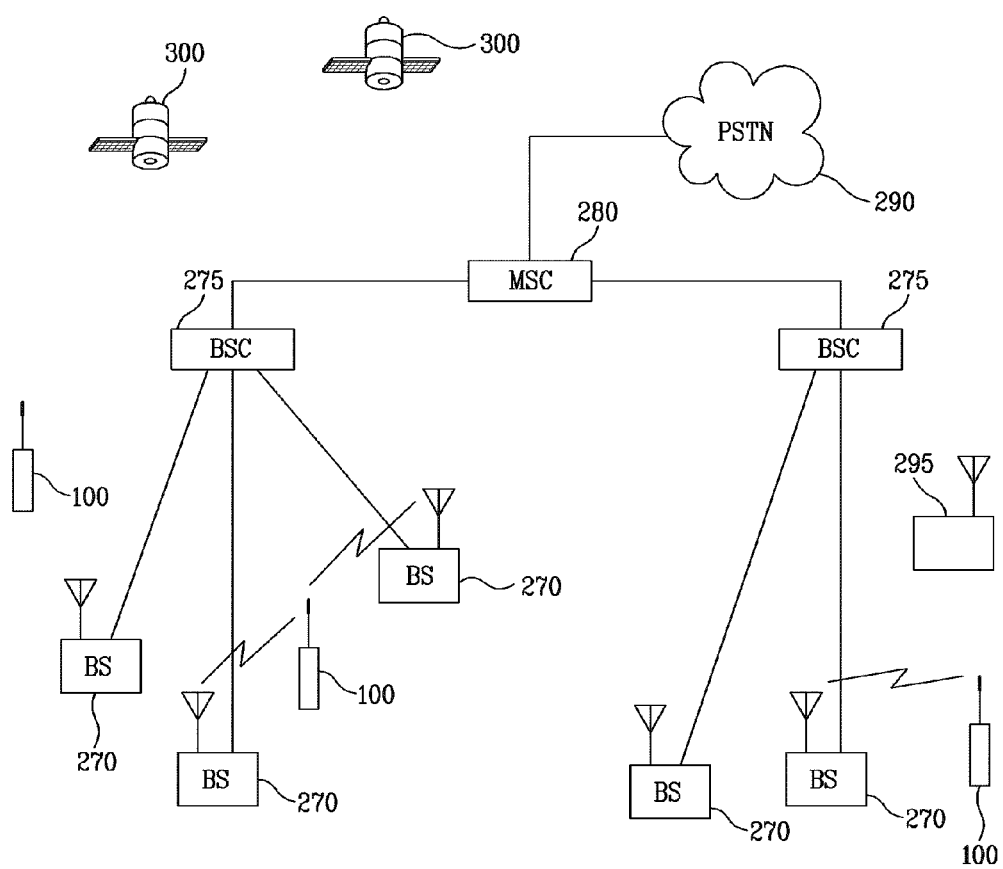
FIG. 4 is an overview of a communication system operable with a mobile terminal according to an embodiment of the present invention.

FIG. 4 illustrates a CDMA wireless communication system having a plurality of mobile terminals 100, a plurality of base stations 270, a plurality of base station controllers (BSCs) 275, and a mobile switching center (MSC) 280. Referring to FIG. 4, the MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum, for example, 1.25 MHz or 5 MHz.

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites 300 facilitate locating the position of some or all of the mobile terminals 100. In FIG. 4, two satellites 300 are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the present disclosure, there is provided a method for merging conversation content of one or more sessions into a single conversation window when a user performs an instant messaging (IM) service in the mobile terminal 100 by using a plurality of conversation windows corresponding to a plurality of sessions. For example, the present disclosure proposes a method for displaying conversation content of at least two sessions on a single screen or for merging conversation content of at least two sessions into a single session and displaying the merged conversation content when a user performs an IM service in the mobile terminal 100.

In the present disclosure, conversation window merging and session merging may be performed during conversation via the IM service. In particular, two separate sessions are displayed together on a single conversation window when the conversation window merging is performed and a single session is generated by combining two separate sessions such that at least three parties are involved in the conversation when the session merging is performed.

The conversation window merging and the session merging may include merging between messengers and merging between a messenger and an SMS (Short Message Service) or MMS (Multimedia Message Service). That is, user 'A' may conduct a conversation with a desired party by using a messenger function of the mobile terminal 100 and the mobile terminal 100 performs merging between messengers by bringing user 'B' into a conversation window of the user 'A'.

When a message, for example, SMS or MMS, is received from user 'B' while user 'A' conducts conversation with user 'C', the mobile terminal 100 automatically displays the message received from user 'B' on the conversation window or conversation screen. This setting may be implemented by selecting an indicator of an SMS or an MMS provided at the conversation window.

When a call is received from user 'B' while user 'A' conducts a conversation with user 'C', the mobile terminal 100 is configured such that user 'C' automatically participates in conversations between user 'A' and the 'B'. Once user 'A' starts transmitting a message (SMS or MMS) or an IM service when user 'A' has input content to be transmitted to user 'B' to the conversation window, the mobile terminal 100 automatically transmits an SMS or MMS message.

As discussed above, the present disclosure is directed to various methods for performing conversation window merging and session merging. Firstly, the present disclosure provides a one-to-one (1:1) method for merging conversation windows of two users.

According to the one-to-one method, user 'B' is merged into a conversation window '1' of user 'A'. This method is useful when transmitting private messages, such as secrets or discussion of business affairs, between two parties and has advantages in that a UI configuration is simple and manipulation of the mobile terminal 100 is easy.

Secondly, the present disclosure provides a one-to-multi (1:M) method for merging conversation windows by inviting two or more parties to one conversation window. According to the one-to-multi method, user 'C' and user 'D' are merged into a conversation window '2' of user 'A'. This method has an advantage in that many users can conduct conversation all together.

Alternatively, the present disclosure provides a combination method between the '1:1' method and the '1:M' method. This method has advantages in that many users can simultaneously conduct conversations and conversation parties can be changed at any time.

For example, user 'B' is merged into the conversation window '1' of user 'A' and users 'C' and 'D' are merged into the conversation window '2' of user 'A.' If user 'D' leaves the conversation window '2', user 'C' is automatically merged into the conversation window '1' of user 'A'. Alternatively, when user 'B' is merged into the conversation window '1' of user 'A' and users 'C' and 'D' are merged into the conversation window '2' of user 'A', if user 'D' who has left the conversation window '2' tries to conduct conversation, user 'D' is automatically merged into the conversation window '1' of user 'A'.

The above discussed various merging methods are determined according to the number of users or parties. When too many users participate in conversation on a single conversation window, it is difficult for the users to view conversation content in a limited space of a screen on which a conversation window is displayed. Accordingly, in the '1:M' method and the combination method, there may be a limitation in the number of users who can be merged. Hereinafter, call options for restricting merging will be explained in more detail.

A user may preset conversation windows to be merged. For example, one conversation window may be set as 'X' where users 'A', 'B' and 'C' conduct conversation and the other conversation window may be set as 'Y' where users 'C' and 'D' conduct conversation. When user 'C' requests conversation while users 'A' and 'B' conduct conversation on the conversation window 'X', the controller automatically merges user 'C' into the 'X'. On the other hand, when user 'D' requests a conversation while users 'A' and 'B' conduct conversation on the conversation window 'X', the controller automatically merges user 'D' into the 'X'.

In the present disclosure, a user's automatic participation may be determined based on a length or amount of text in the conversation. For example, when conversation content between two users 'A' and 'B' has a length more than a predetermined length, automatic participation of user 'C' may be restricted. The length of the conversation content serves as an important criteria for determining whether to allow automatic participation of a user in conversation, along with the number of users.

In the present disclosure, not every user is merged into a preset conversation window. On the conversation window, users may exchange their private messages with one another. Thus, a user may be reluctant to open conversation content to other party. Accordingly, in one aspect of the present invention, automatic participation in conversation of certain users, for example, a lover, a family member and a boss, may be limited.

As aforementioned, the mobile terminal 100 of the present disclosure is capable of merging between messengers and merging between a messenger and an SMS or MMS. However, the mobile terminal 100 may be set to merge only between messengers so as to allow a user to more conveniently check a UI function or conversation content.

All call options may be set or released by one or more menu buttons and soft keys provided at a user menu or a conversation window. Further, a color and a size of the conversation content and a name of the party present in the conversation or session may be displayed distinguishably on the screen according to the menu buttons, the soft keys and other buttons. Hereinafter, a method for merging conversation windows in an IM service will be explained in more detail.

Figure 5:
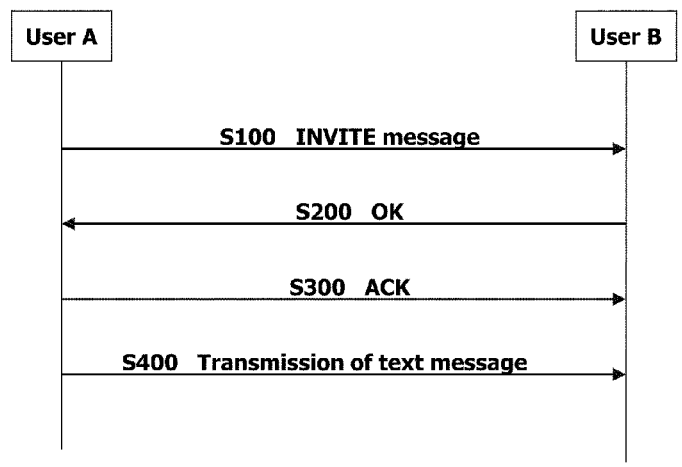
FIG. 5 illustrates a communication session established between two users according to an embodiment of the present invention.

Referring to FIG. 5, user 'A' transmits an INVITE message to user 'B' to invite user 'B' to a conversation or communication session (S100). The INVITE message may include information indicating session invitation for transmission of a text message. Then, user 'B' having received the INVITE message transmits an OK message to user 'A', acknowledging the invitation (S200). In response to the OK message, user 'A' transmits an ACK message to user 'B' (S300).

Accordingly, one SIP session (hereinafter referred to as 'session') is set between users 'A' and 'B'. Under this configuration, user 'A' transmits a text message to user 'B' through the set session (S400) and a conversation window is created on a screen of each mobile terminal belonging to users 'A' and 'B'.

Figure 6:
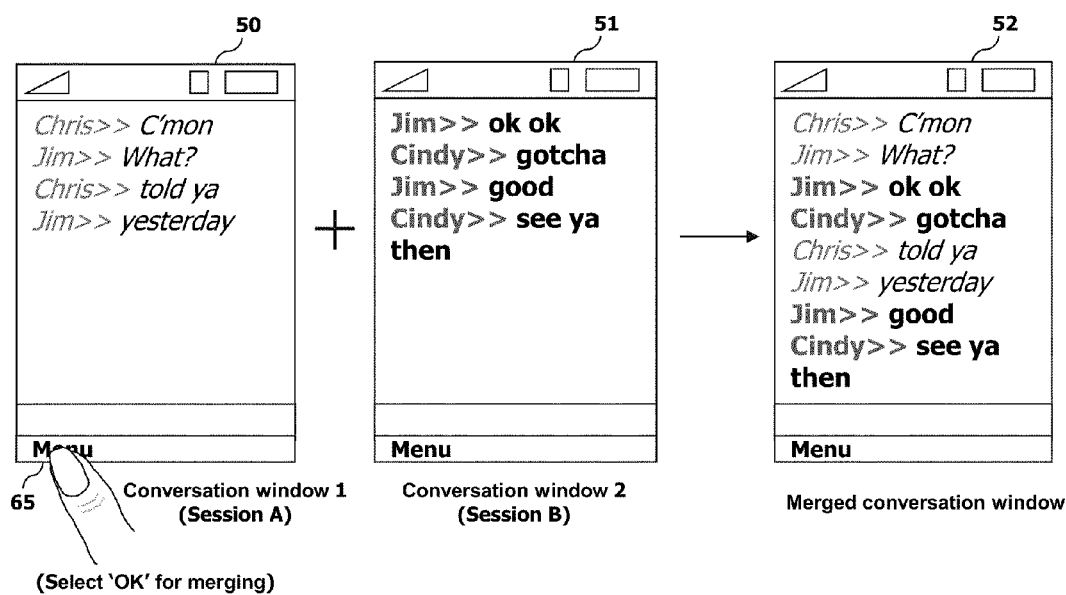
FIG. 6 illustrates merging conversation content of separate sessions displayed on separate conversation windows and displaying both sessions in a single conversation window.

Referring to FIG. 6, an example of merging conversation content of each session into a single conversation window will be described. As shown in FIG. 6, user 'A' (Jim) establishes "session A" with user 'B' (Chris) and "session A" is displayed on conversation window 50. User 'A' establishes a separate session 'B' with user 'C' (Cindy) and "session B" is displayed on conversation window 51. User 'A' individually conducts conversation with users 'B' and 'C' through two separate conversation windows 50 and 51.

Figures 7, 8:
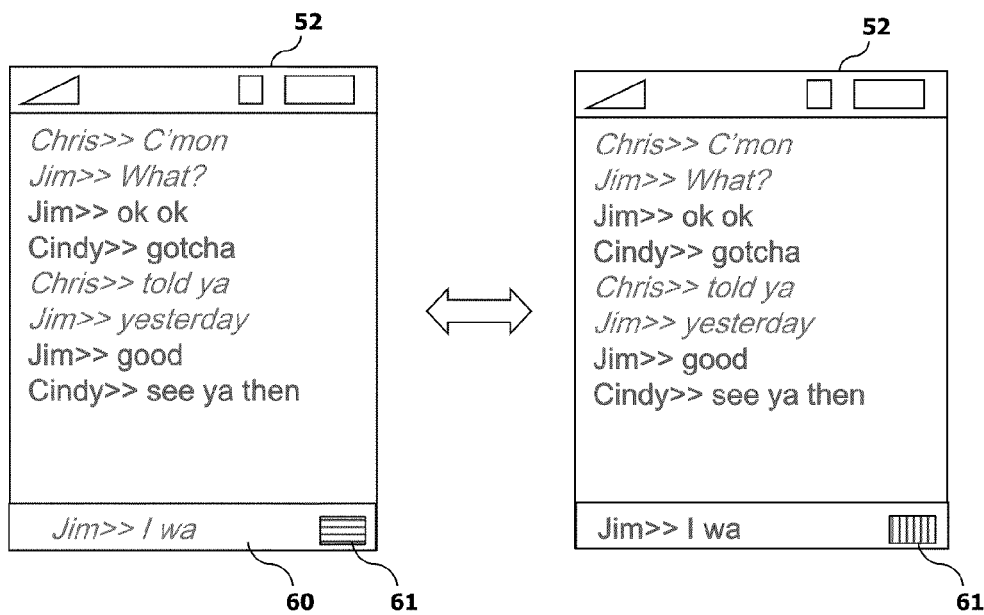
FIG. 7 is an exemplary view of a merging menu used for merging conversation content in a mobile terminal according to an embodiment of the present invention.
FIG. 8 illustrates inputting conversation content onto a merged conversation window according to an embodiment of the present invention.

A menu 65 may be provided at a portion of the conversation window 50 for merging the sessions A and B. When the menu 65 is selected, for example, by directly touching the menu 65 displayed on the conversation window 50 or by moving a cursor and placing the cursor on the menu 65, two menu items for merging, for example, "1. conversation window merging" and "2. session merging," are displayed on the screen as shown in FIG. 7.

When user 'A' selects the conversation window merging item from the menu and clicks an OK button, conversation content on the two conversation windows 50 and 51 is merged and the merged conversation content, including both conversation contents, is displayed on a single conversation window 52, as shown in FIG. 6. The conversation contents merged from the conversation window 50 and the conversation window 51 may be displayed on the merged conversation window 52 so as to be distinguishable from each other. For example, two different sessions on the conversation window 52 may be displayed in at least different colors, fonts, or sizes to distinguish one session from another session, as shown in FIG. 6.

Further, the conversation content may be displayed on the merged conversation window 52 in various orders. For example, as shown in FIG. 6, the conversation content previously displayed on the conversation window 50 and the conversation content previously displayed on the conversation window 51 may be alternately displayed on the conversation window 52. Alternatively, the entire conversation content previously displayed on the conversation window 51 may be displayed after the conversation content previously displayed on the conversation window 50. The display order of the conversation content may be changed by a menu setting.

Accordingly, user 'A' may better view the merged conversation content through the conversation window 52. In the present disclosure, merging of the conversation windows indicates merging of the conversation content.

However, under the conversation window merging, sessions 'A' and 'B' still remain independent of each other on a protocol level without being merged into one. In other words, while user 'A' is able to communicate with both users 'B' and 'C' via the conversation window 52, users 'B' and 'C' can communicate only with user 'A' and cannot communicate with each other.

Referring to FIG. 8, a process of inputting conversation content to a merged conversation window 52 will be described. As shown in FIG. 8, once the conversation content displayed on the two conversation windows 50 and 51 is merged and displayed on the conversation window 52, user 'A' may enter conversation content to a conversation input window 60 of the merged conversation window 52.

However, since users 'B' and 'C' co-exist on the conversation window 52, the controller 180 of the mobile terminal 100 must determine to which one of users 'B' and 'C' the newly entered conversation content will be transmitted. Accordingly, user 'A' is required to indicate to which one of users 'B' and 'C' the conversation content entered by user 'A' will be transmitted. The receiving user may be indicated before or after entering the conversation content or message, but before transmitting the conversation content.

In the present disclosure, a soft button (soft switch) 61 configured to toggle one session to another session is provided at one portion of the conversation input window 60. The soft button 61 may be toggled by touch or key selection. The soft button 61 represents a session to which the input conversation content is to be transmitted, either the first session (session A) or the second session (session B), by being displayed in different colors.

For example, when the soft button 61 is displayed in red, it indicates that the input conversation content is be to be transmitted to the first session. On the other hand, when the soft button 61 is blue, it indicates that the input conversation content is be to be transmitted to the second session. These color settings may be changed by menu settings. When there is no menu settings, a color may be displayed according to a default setting.

For example, if user 'A' (Jim) enters or types in conversation content to the conversation input window 60 after setting the current color of the soft button 61 to 'Red', the conversation content is automatically sent to user 'B' (Chris) upon completion of the entry of the conversation content by user 'A'. Alternatively, if user 'A' (Jim) enters conversation content to the conversation input window 60 after changing the current color of the soft button 61 to 'Blue', the conversation content is automatically sent to user 'C' (Cindy). Thus, according to an embodiment of the present invention, user 'A' selects a session to which conversation content is to be transmitted by toggling the soft button 61 located on the merged conversation window 52.

Figure 9:
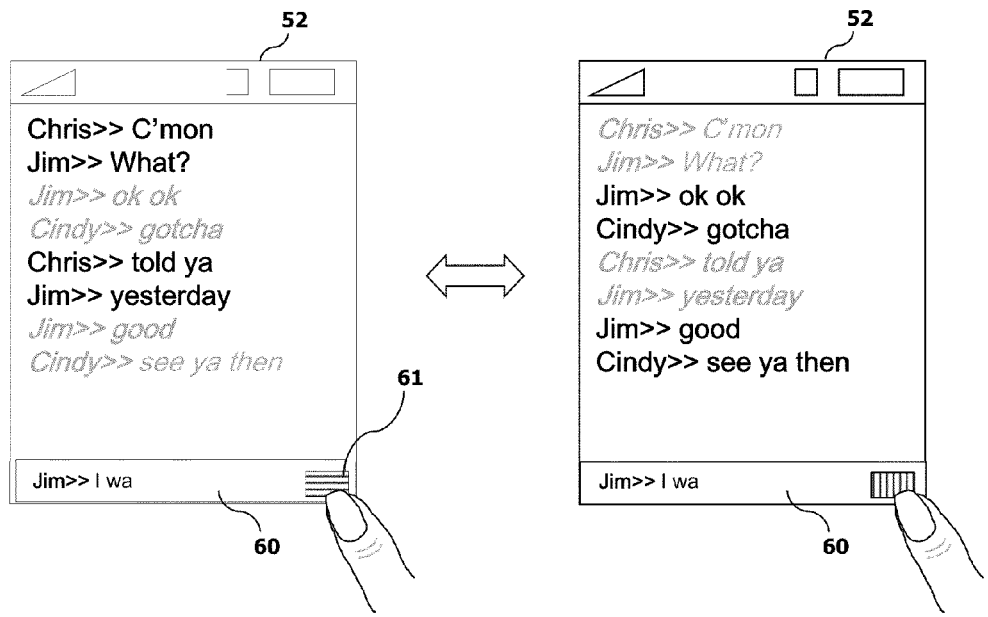
FIG. 9 illustrates inputting conversation content onto a merged conversation window according to an embodiment of the present invention.

Referring to FIG. 9, another process of inputting conversation content to a merged conversation window 52 will be described. The embodiment shown in FIG. 9 is the same as the embodiment shown in FIG. 8 in that a session to which conversation content is to be transmitted is determined by toggling the soft button 61 on the merged conversation window 52.

However, the embodiment shown in FIG. 9 is different from the embodiment shown in FIG. 8 in that the conversation content of a session not selected via the soft button 61 is processed with a color that is different from a color used to display the conversation content of the selected session. For example, the conversation content of the selected session may be displayed in black and the conversation content of the unselected session may be displayed in gray.

In FIG. 8, the conversation content of sessions 'A' and 'B' may be displayed in different colors regardless of session selection by the soft button 61. However, when the amount of conversation content increases, desired conversation content with a specific user may not be easily recognized.

Accordingly, in FIG. 9, conversation content of a session that is not selected by the soft button 61 is processed with a color of gray. This setting may be also performed via a merging menu 65 provided at a portion of the conversation window 50.

Figure 10:
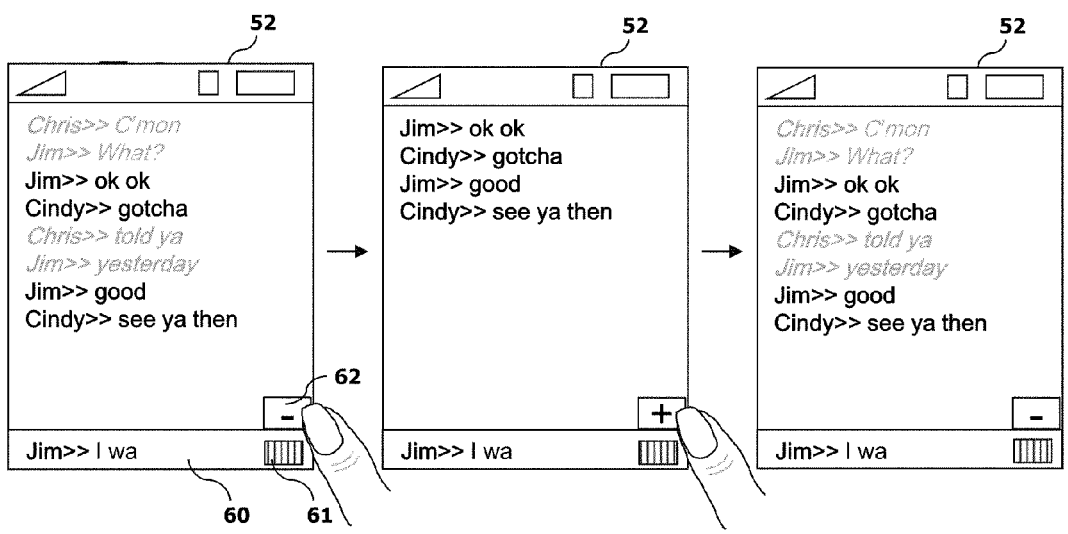
FIG. 10 illustrates inputting conversation content onto a merged conversation window according to another embodiment of the present invention.

Referring to FIG. 10, yet another process of inputting conversation content to a merged conversation window 52 will be described. The embodiment shown in FIG. 10 is the same as the aforementioned embodiments shown in FIGS. 8 and 9 in that a session to which conversation content is to be transmitted is selected by toggling the soft button 61 on the merged conversation window 52. However, the embodiment shown in FIG. 10 is different from the embodiments shown in FIGS. 8 and 9 in that conversation content of a session not selected via the toggle switch 61 is temporarily not displayed on the screen.

In order to implement the above configuration, as shown in FIG. 10, a show/hide button (or toggle button) 62 is provided at one portion of the conversation window 52 where conversation content is displayed. The show/hide button 62 serves as a toggle button for switching between the two sessions 'A' and 'B' such that conversation content in a session selected via the soft button 61 appears or disappears.

Accordingly, when the show/hide button 62 is toggled, "+" indicates that the conversation content of a first session (session A) has disappeared, whereas "−" indicates that all conversation content has been displayed or the disappeared conversation content has been re-displayed. For example, as shown in FIG. 10, when the show/hide button 62 in "+" status is selected, the conversation window 52 displays conversation content from both sessions A and B and the status of the show/hide button 62 becomes "−."

Figure 11:
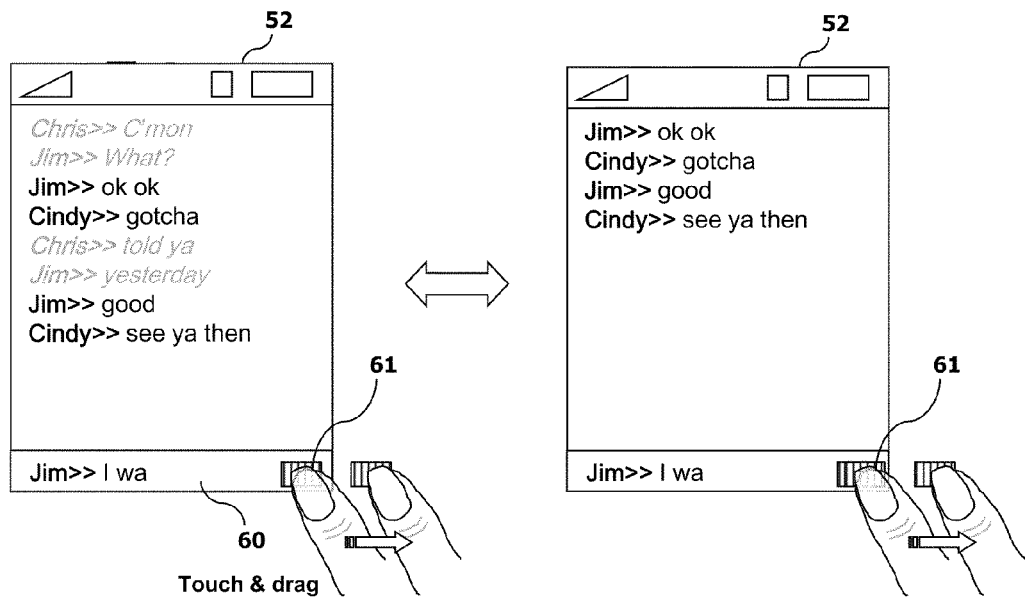
FIG. 11 illustrates controlling display of conversation content by selecting a specific session among a plurality of conversation sessions by toggling a soft button of a mobile terminal according to an embodiment of the present invention.

In the present disclosure, instead of a separate show/hide button 62, the soft button 61 may also be operated as a show/hide button. For example, as shown in FIG. 11, if the soft button 61 is touched and dragged to a specific position after a desired session is selected by toggling the soft button 61, conversation content of a session that is not selected may disappear while the conversation content of the selected session remains displayed on the conversation window 52. If the same procedure is performed again after the unselected session has disappeared, the disappeared conversation may be re-displayed on the conversation window 52.

Figure 12:
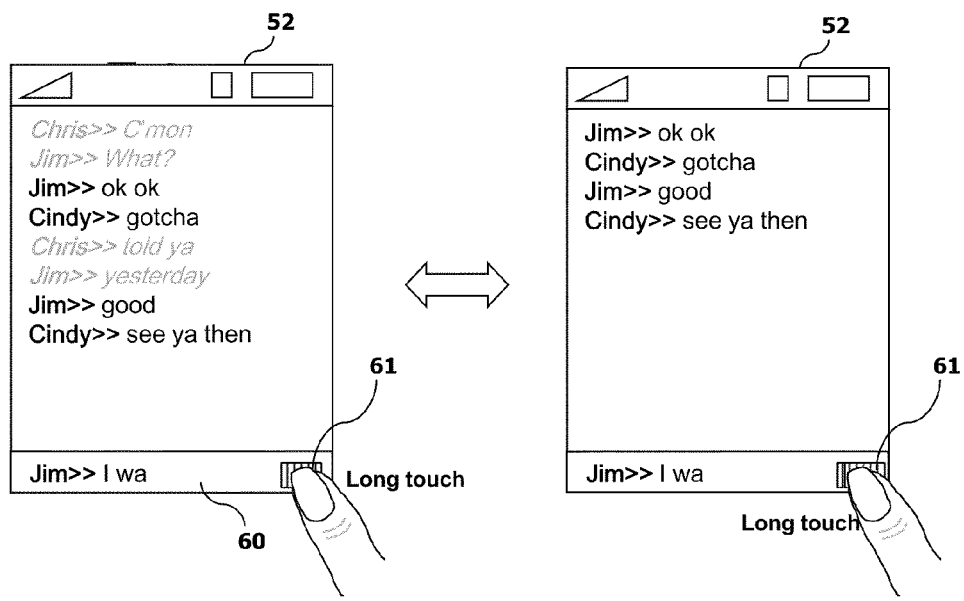
FIG. 12 illustrates controlling display of conversation content by selecting a specific session among a plurality of conversation sessions by toggling a soft button of a mobile terminal according to another embodiment of the present invention.

Alternative to the touching and dragging of the soft button shown in FIG. 11, the soft button 61 may be controlled by receiving a long touch as shown in FIG. 12. For example, when the soft button 61 is touched for at least a predetermined period of time, only the selected session is displayed while the unselected session disappears from the conversation window 52. If the same procedure is performed again after the unselected session has disappeared, the disappeared conversation may be re-displayed on the conversation window 52.

Figure 13:
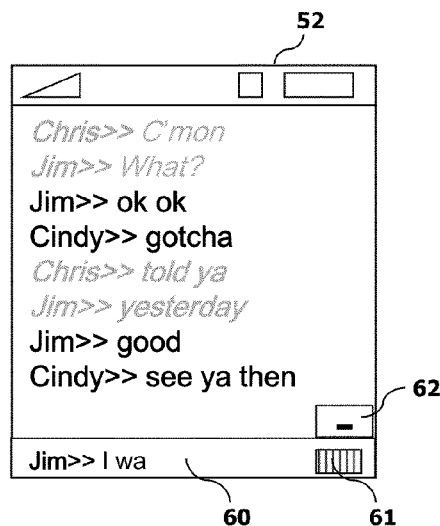
FIG. 13 shows an example of a default session displayed on a mobile terminal according to an embodiment of the present invention.

Referring to FIG. 13, an example of selection of a default session will be described. User 'A' should select a session to which the conversation content is to be transmitted before inputting conversation content to the conversation input window 60 on the merged conversation window 52. If a specific session is not selected by user 'A', user A's preferred session or a default session will be displayed at an early merging stage if two or more conversation windows are merged into one.

User A's preferred session may be set by the merging menu. If user A's preferred session is not set, a first established session may be regarded as a default session, or a specific session may be regarded as a default session in consideration of alphabetical orders of users' names or lengths of conversation content. For example, the user's name starting with an earlier alphabetical order or the conversation content having a long length may be regarded as a default session. Accordingly, when user 'A' (Jim) inputs conversation content when his preferred session has been set, the preset session 'A' is automatically selected.

The merging menu includes a menu option for simultaneously transmitting the same conversation content or message to a plurality of users. Once user 'A' (Jim) selects the menu option for simultaneous transmission, the same message, for example, "I'll come back after lunch." is sent to users 'B' and 'C' through all the sessions (session A and B) being currently executed.

Figure 14:
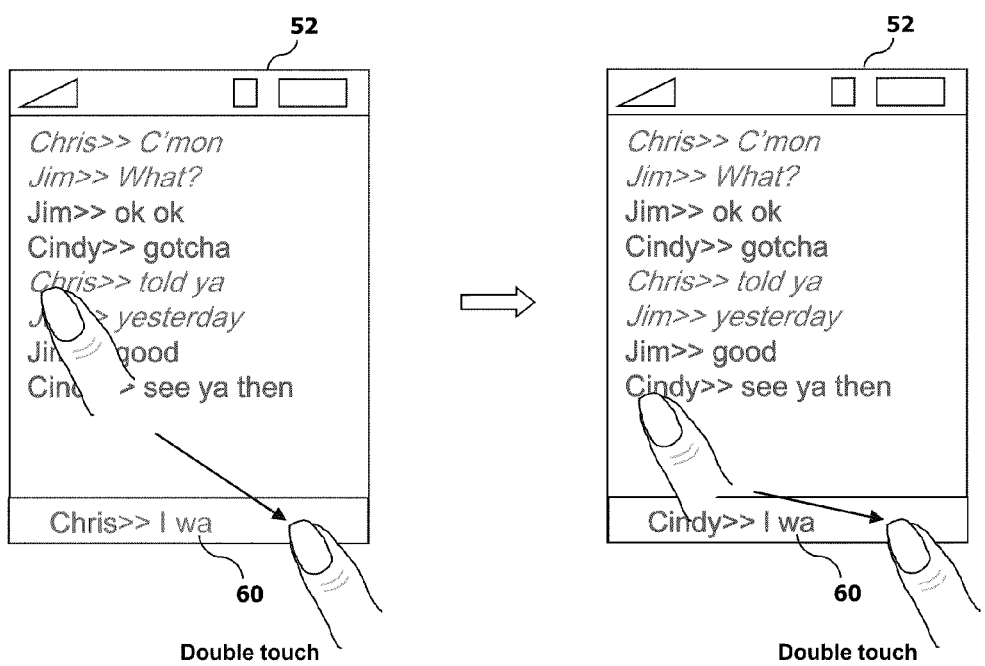
FIG. 14 illustrates selecting a party to which inputted conversation content is to be transmitted according to an embodiment of the present invention.

Referring to FIG. 14, a process of selecting a party to which inputted conversation content is to be transmitted will be described. In particular, the method shown in FIG. 14 may be effective when the soft button 61 is not provided.

When selecting the conversation input window 60 after selecting user 'B' (Chris) to which conversation content is to be transmitted, session 'A' is automatically selected. On the other hand, when selecting the conversation input window 60 after selecting user 'C' (Cindy) in the same manner, session 'B' is automatically selected as a session to which conversation content is to be transmitted.

For example, as shown in FIG. 14, in order to select user 'B' or session 'A', the user may simply touch user 'B' (Chris) and then subsequently touch the conversation input window 60. User 'C' (Cindy) or session 'B' may be selected in a similar manner as in the selection of user 'B' or session 'A'. This method is advantageous in that a user can select a party with a minimized number of manipulations during conversations with a plurality of parties.

Figure 15:
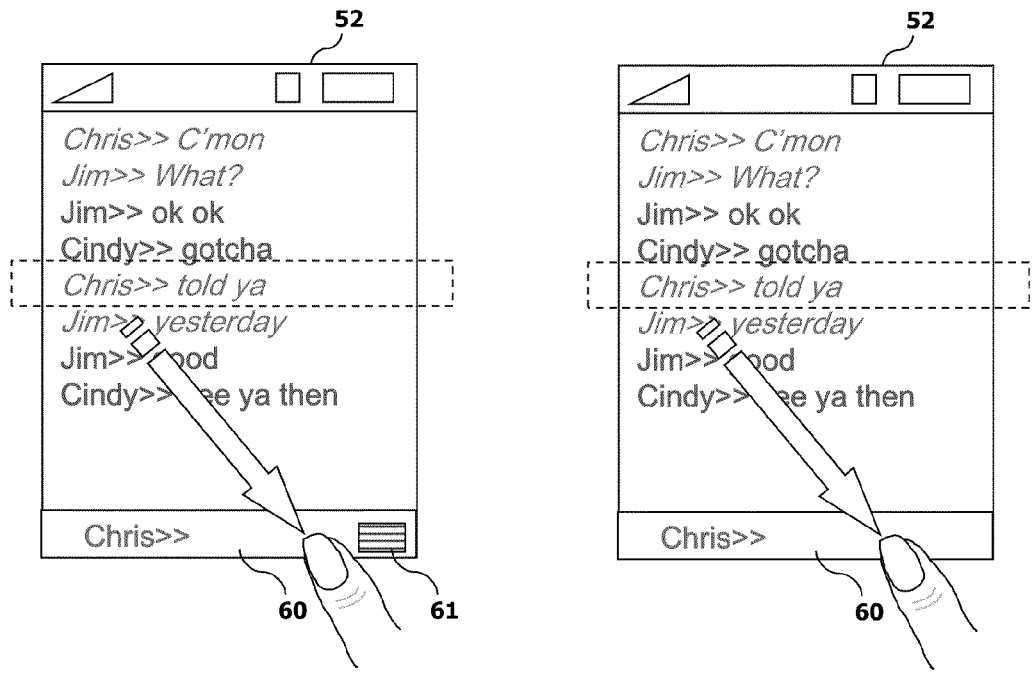
FIG. 15 illustrates transmitting conversation content input to a merged conversation window according to an embodiment of the present invention.

Referring to FIG. 15, a method for transmitting conversation content input to a merged conversation window 52 will be described. As shown in FIG. 15, conversation content or an emoticon corresponding to the conversation content to be transmitted is touched and then dragged to the conversation input window 60 for transmission.

For this, the soft button 61 is toggled as shown in FIG. 8 so as to select a desired session in advance. For example, session 'A', as shown in FIG. 15, or a party to which conversation content is to be transmitted is selected in advance as shown in FIG. 14. The method shown in FIG. 15 has an advantage in that a user can simply transmit conversation content to another party by touching and dragging.

Figure 16:
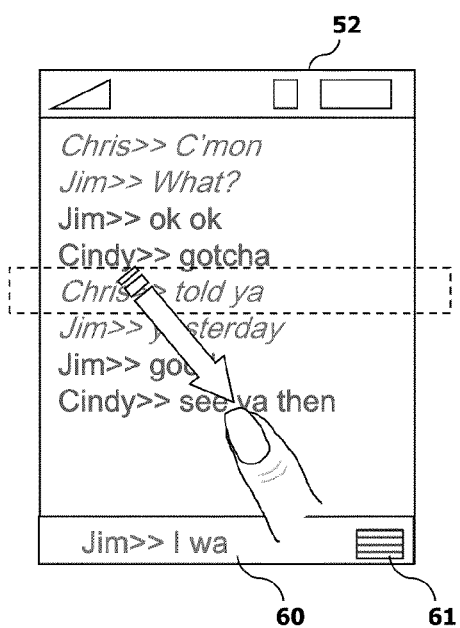
FIG. 16 illustrates transmitting conversation content input to a merged conversation window according to another embodiment of the present invention.

Referring to FIG. 16, another method for transmitting conversation content input to a merged conversation window 60 will be described. As shown in FIG. 16, conversation content or an emoticon corresponding to the conversation content to be transmitted is touched and then is dragged to a desired conversation line. Accordingly, the embodiment shown in FIG. 16 does not require toggling the soft button 61 in order to select a desired session in advance, as shown in FIG. 8, and the process for selecting a party to which conversation content is to be transmitted, as shown in FIG. 14.

Figure 17:
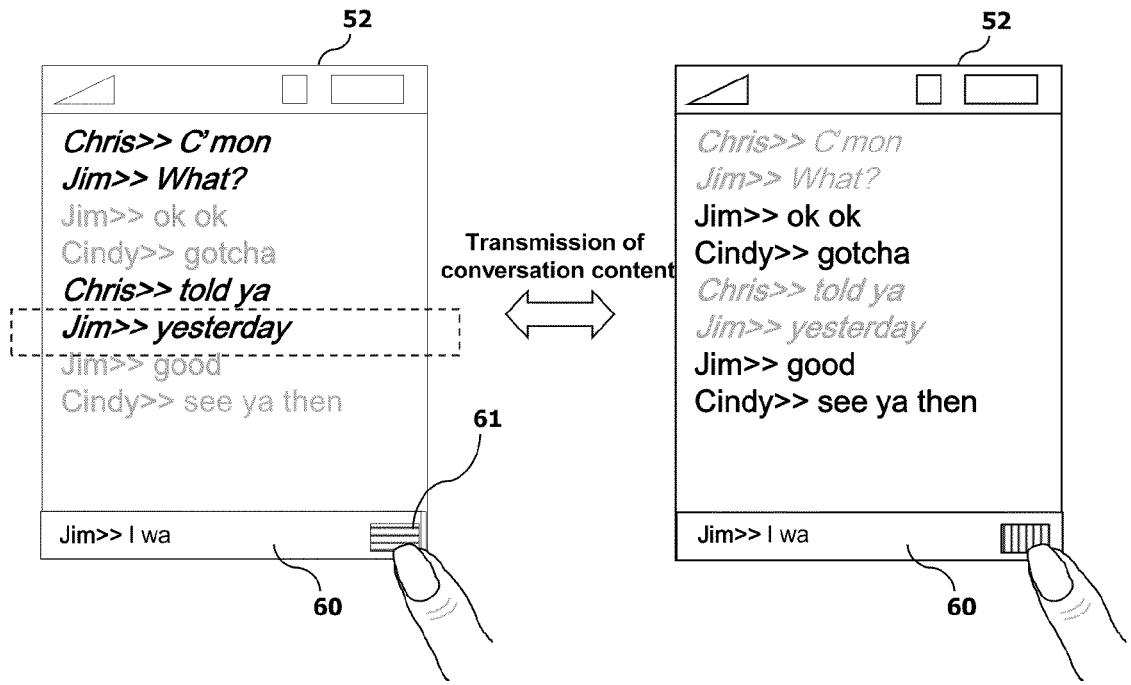
FIG. 17 illustrates transmitting conversation content input to a merged conversation window according to yet another embodiment of the present invention.

Referring to FIG. 17, yet another method for transmitting conversation content input to a merged conversation window 60 will be described. According to the embodiment shown in FIG. 17, conversation content to be transmitted is copied. If the soft button 61 is toggled to select a desired session, for example, session 'A' in advance as shown in FIG. 8, or if a party to which conversation content is to be transmitted is selected, as shown in FIG. 14, the copied conversation content is automatically transmitted to a corresponding user.

The present invention is not limited to the above discussed method. Alternatively, when the soft button 61 has been toggled to select a desired session in advance, as shown in FIG. 8, or when a party to which conversation content is to be transmitted has been selected, as shown in FIG. 14, conversation content is automatically transmitted when a user inputs the conversation content to the conversation input window 60.

Figure 18A:
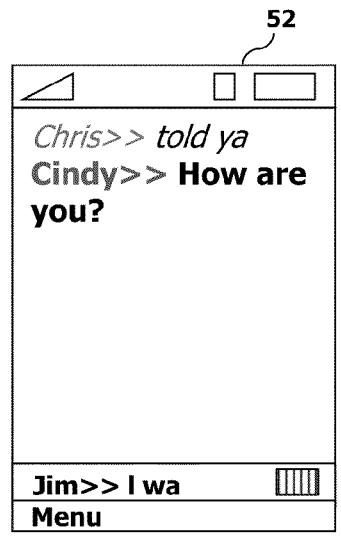
FIGS. 18A and 18B illustrate re-arranging conversation lines as a new user is added during conversation according an embodiment of the present invention.

While user 'A' (Jim) and user 'B' (Chris) conduct conversations on the merged conversation window 52, if user 'C' (Cindy) is added, the conversation lines are moved upward as shown in FIG. 18A. This may cause user B's conversation content not to be displayed on the screen. In this case, user B's last conversation content is displayed on the uppermost part of the screen for recognition of the last conversation party, as shown in FIG. 18A.

Figure 18B:
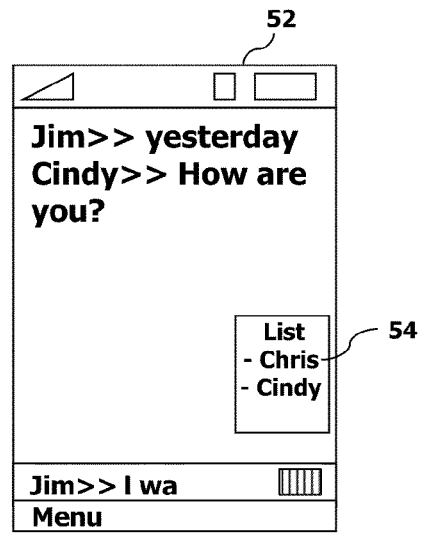

Alternatively, a conversation list 54 is displayed on a portion of the screen, as shown in FIG. 18B, such that user 'A' can select his conversation party. The conversation party may be changed by using the conversation input window 60, the toggle switch 61, or a motion sensor.

FIGS. 6 to 18A show a method for merging a plurality of sessions displayed on two or more conversation windows into one while maintaining each of the plurality of sessions independently on a merged conversation window. FIGS. 6 to 18A further show a method for inputting conversation content to the merged conversation window and a method for transmitting the input conversation content to a receiving party. However, the concept of "merging" in the present disclosure is not limited to conversation window merging, but may be directed to session merging. Accordingly, session merging will be explained hereinafter.

Figure 19:
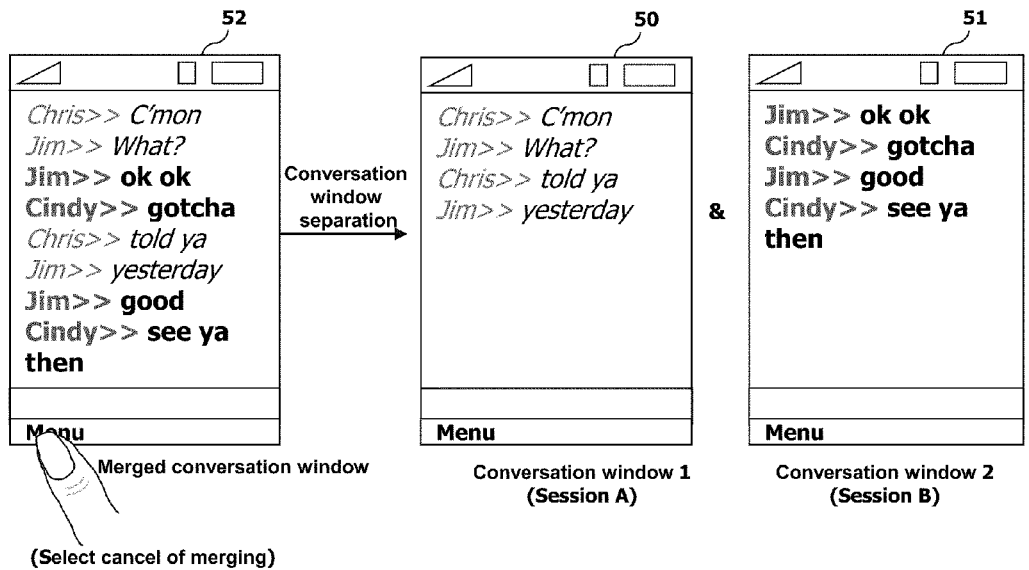
FIG. 19 illustrates separating a merged conversation window into two conversation windows according to an embodiment of the present invention.

Referring to FIG. 19, a merged conversation window 52 may be separated into two conversation windows 50 and 51. As shown in FIG. 6, user 'A' (Jim) may select "conversation window merging" from the merging menu and press an 'OK' button, thereby merging the two conversation windows 50 and 51 into one conversation window 52. If user 'A' (Jim) re-selects "conversation window merging" and clicks an 'OK' button, the merged conversation window 52 is separated into two individual conversation windows 50 and 51 for display on the screen.

Figure 20:
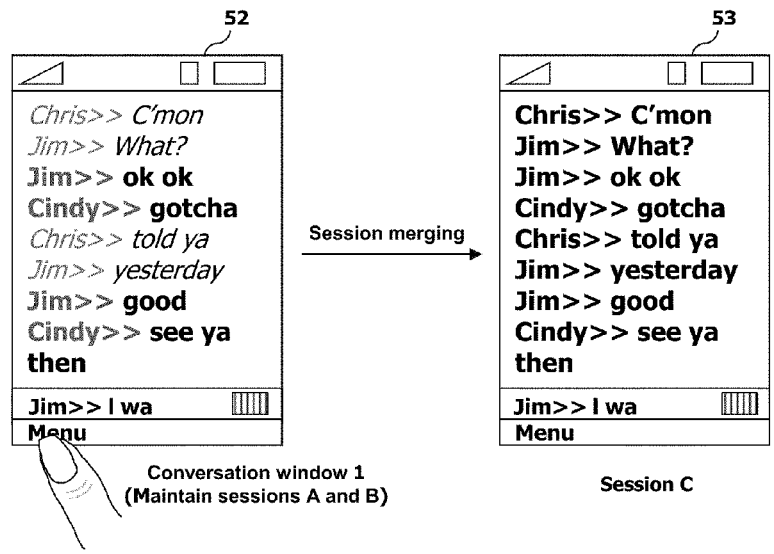
FIG. 20 illustrates merging a plurality of sessions into a single session according to an embodiment of the present invention.

Referring to FIG. 20, a process of merging a plurality of sessions into one session will be described. User 'A' (Jim) establishes session 'A' with user 'B' (Chris) and also establishes session 'B' with user 'C' (Cindy). Thus, user 'A' individually conducts conversation with users 'B' and 'C' via the two conversation windows 50 and 51, respectively.

Once the merging menu provided at a portion of the conversation window 50 is selected, two items "1. conversation window merging" and "2. session merging" are displayed on the screen. If user 'A' selects the "conversation window merging" from the two merging menu items and clicks an "OK" button, conversation content on the two conversation windows 50 and 51 is merged and displayed together on one conversation window 52, as shown in FIG. 6. In the mode of conversation window merging, sessions 'A' and 'B' still remain independent on a protocol level.

Contrary to the conversation window merging, if user 'A' selects "session merging" from the merging menu and clicks an 'OK' button, a conversation window 53 corresponding to a new session 'C' is displayed on the screen as sessions 'A' and 'B' are merged into a single session as shown in FIG. 20. When session merging, sessions 'A' and 'B' may still remain on the protocol level.

Specifically, once the 'session merging' item is selected from the merging menu, user 'A' (Jim)'s mobile terminal 100 transmits an INVITE message to mobile terminals of all users (Chris and Cindy) in sessions 'A' and 'B', thereby creating a new session 'C'. Changes or selection of a conversation party, input of conversation content, transmission and screen display on a conversation window 53 having been session-merged are performed in the same manner as on the conversation window 52 having been conversation window-merged. Thus, their detailed explanations will be omitted.

Figure 21:
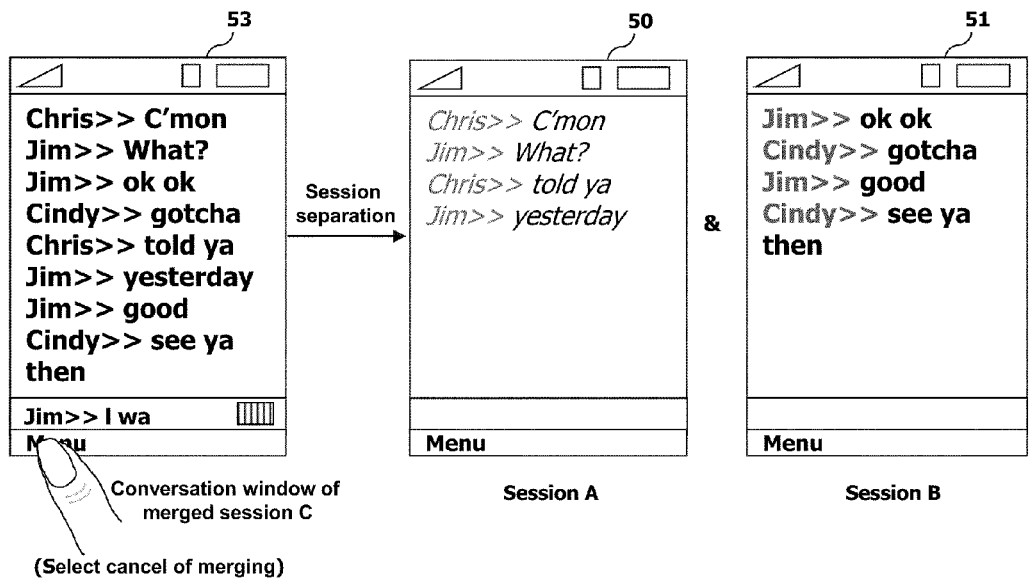
FIG. 21 illustrates separating a merged session into a plurality of individual sessions according to an embodiment of the present invention.

Referring to FIG. 21, a process of separating a merged session into a plurality of individual sessions will be described. As mentioned in FIG. 20, user 'A' (Jim) selects "session merging" from the merging menu and clicks an "OK" button, thereby creating the session-merged conversation window 53.

If user 'A' (Jim) selects "conversation window merging" from the merging menu and clicks a "cancel" button, the merged conversation window 53 is separated into two individual conversation windows 50 and 51 corresponding to the individual sessions 'A' and 'B', respectively, and displayed on the screen. In particular, when the "cancel" button is selected, user 'A' (Jim)'s mobile terminal 100 transmits a BYE message to mobile terminals of all the other users (Chris and Cindy), thereby concluding the new session 'C'.

In the present disclosure, the user may store individual conversation windows, a merged conversation window, or detailed conversation content during conversation by pressing a "save" button. Then, when the user clicks an "end" key to finish all the conversations, all sessions are finished. Alternatively, conversations with a specific user may be finished by using a check box on the merging menu.

Figure 22:
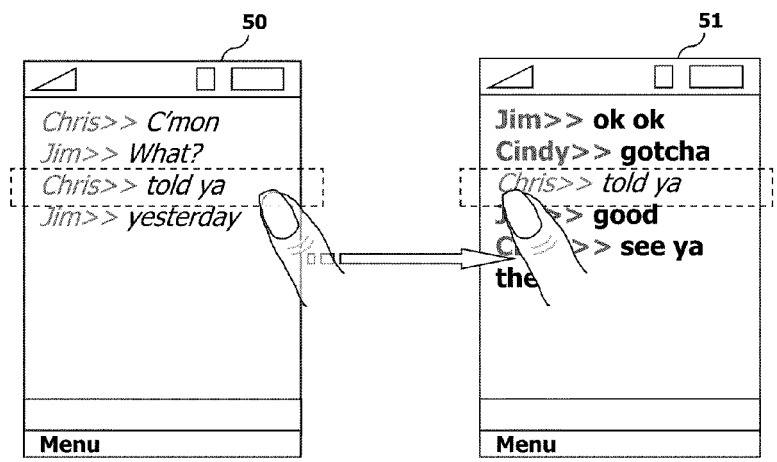
FIG. 22 illustrates inviting a user from one conversation window to another conversation window according to an embodiment of the present invention.

FIG. 22 illustrates a method for inviting a user from one conversation window to another conversation window. As shown in FIG. 22, a user on one conversation window 50 is dragged to another conversation window 51, thereby allowing the user to participate in conversation conducted on another conversation window 51.

For example, if user 'A' (Jim) merges user 'B' (Chris) to the conversation window 51 in a touch and drag manner, the user 'B' (Chris) automatically participates in conversation conducted on the conversation window 51. Since the touch and drag operation means invitation to another session, user 'B' (Chris) may remain in the two sessions 'A' and 'B'. For this, the mobile terminal 100 of user 'A' transmits a REFER message to the mobile terminal of user 'B', thereby inviting user 'B' to the session 'B'.

Figure 23:
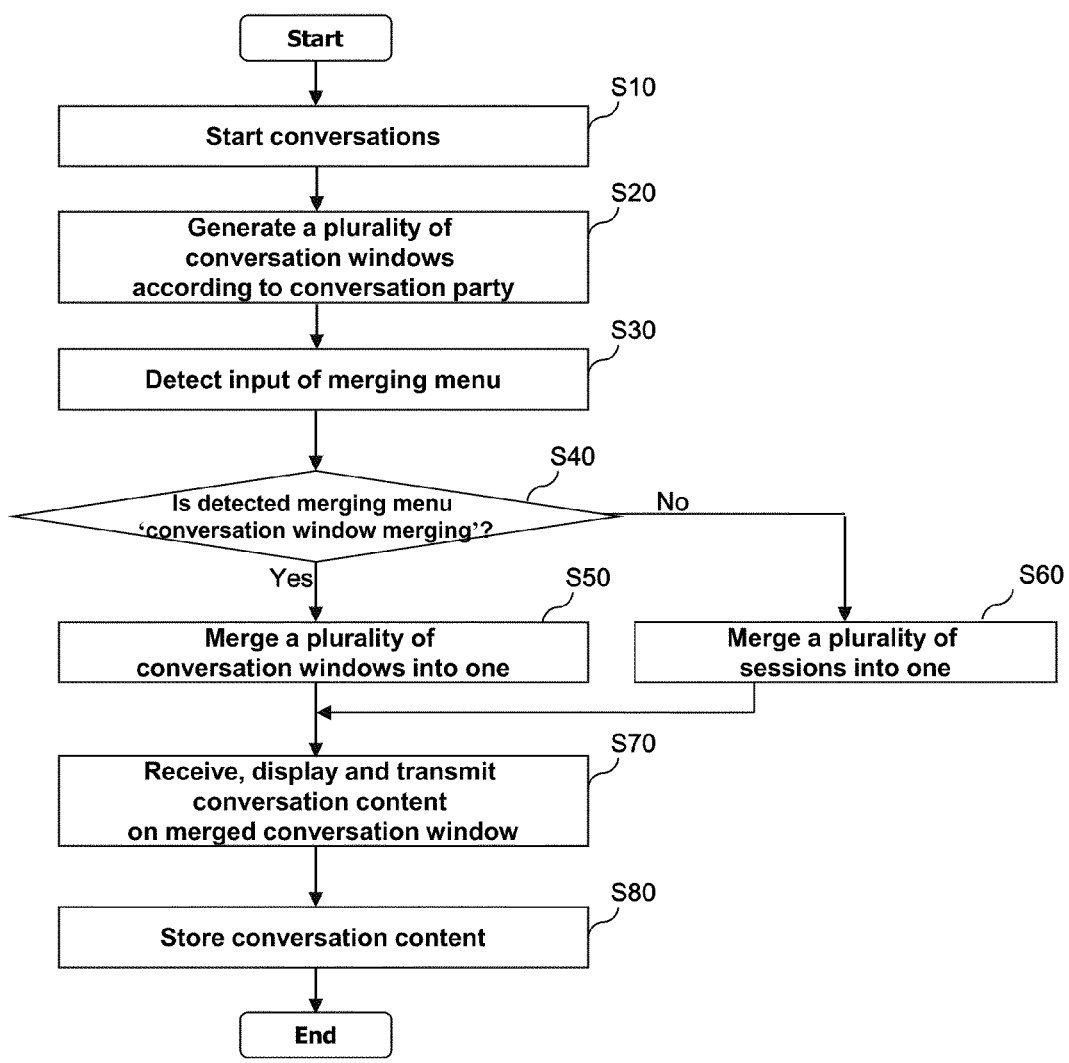
FIG. 23 is a flowchart of a method for controlling multi sessions in a mobile terminal according to an embodiment of the present invention.

FIG. 23 is a flowchart illustrating a multisession managing method according to an embodiment of the present invention. As shown in FIG. 23, once an initial operation starts, user 'A' selects users 'B' and 'C' from the menu to establish independent sessions with 'B' and 'C' (S10). Then, the controller 180 transmits an INVITE message to the mobile terminals of users 'B' and 'C', thereby creating a plurality of sessions and generating a plurality of conversation windows 50 and 51 corresponding to the created plurality of sessions. Then, the controller 180 displays the created conversation windows 50 and 51 on the screen of the display module 151 (S20).

While user 'A' conducts conversation with user 'B' or 'C' on the created conversation windows 50 and 51, respectively, user 'A' selects the merging menu. The controller 180 detects the user's selection from the merging menu (S30).

If the user has selected the "conversation window merging" (S40), the controller 180 merges the conversation windows 50 and 51 into a single conversation window 52 (S50). On the other hand, if the user has selected the "session merging", the controller 180 merges a plurality of sessions relating to the plurality of conversation windows 50 and 51 into one session, thereby displaying the merged session on a single conversation window 53 (S60).

Accordingly, the controller 180 performs an operation to display conversation content input by the user or an operation to transmit the conversation content on the merged conversation window 52 or 53 (S70). Further, the controller 180 stores the merged conversation window and each conversation content input by the user (S80).

For convenience, detailed explanations about screen display, transmission of conversation content, and storage of the conversation content were not described in detail in the present disclosure. However, it should be noted that the controller 180 performs the entire multisession managing and control, and the merging menu, conversation windows, merged conversation window and conversation content are stored in the memory 136.

According to an embodiment of the present invention, when a user conducts conversation with a plurality of users via a messenger or IM service, conversation content of a plurality of sessions previously individually displayed on a plurality of conversation windows are displayed on a single conversation window, or is displayed on one conversation window by being merged into one session. This may allow a messenger function of the mobile terminal to be performed more simply and conveniently.

The method of the present invention may be implemented as a program code stored in a computer-readable storage medium. The storage medium may include ROM, RAM, CD-ROM, a magnetic tape, a floppy disc, or an optical data storage device. Further, the storage medium may be implemented as carrier wave allowing transmission of data through the Internet. The computer may include the controller of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of communicating with a plurality of entities, the method performed by a mobile terminal and comprising:

establishing a first communication session with a first entity and generating a first window related to the first communication session, first content communicated with the first entity displayed on the first window;

establishing a second communication session with a second entity and generating a second window related to the second communication session, second content communicated with the second entity displayed on the second window;

displaying a first menu list comprising a first menu item and a second menu item when the first or second window is displayed;

performing a window merging in response to selection of the first menu item from the first menu list to merge the second content comprising a second plurality of messages communicated with the second entity into the first content comprising a first plurality of messages communicated with the first entity such that a first identifier corresponding to the first entity and a second identifier corresponding to the second entity are displayed concurrently in different appearances on the first window, wherein the first communication session and the second communication session are independently performed such that the first entity and the second entity cannot communicate with each other via the first or second communication session while the merged content is displayed on the first window after performing the window merging; and performing a session merging in response to selection of the second menu item from the first menu list to merge the first communication session and the second communication session into a third communication session, the third communication session displayed on a third window including the first identifier and the second identifier that are displayed concurrently in a same appearance, wherein:

the first entity and second entity can communicate with each other via the third communication session; and while the first communication session and the second communication session are performed independently in real-time, and the first content and the second content are displayed concurrently on the first window, a display order of the first content and the second content is changeable according to setting from a second menu list such that:

when a first preset display order is set from the second menu list, the first content and the second content are displayed on the first window according to an order of communication with the first entity or the second entity such that a first plurality of messages of the first content and a second plurality of messages of the second content are alternately displayable; and when a second preset display order is set from the second menu list, the entire first content is displayed on the first window prior to or following the entire second content displayed on the first window such that none of the first plurality of messages is displayed between two of the second plurality of messages or none of the second plurality of messages is displayed between two of the first plurality of messages.

2. The method of claim 1, further comprising:

re-displaying the first content on the first window, the second content not displayed on the first window, and re-displaying the second content on the second window, the first content not displayed on the second window, in response to a touch input applied to a menu button that is displayed while the merged content is displayed on the first window, wherein the menu button is also displayed when the first window including the first content is re-displayed or when the second windows including the second content is re-displayed.

3. The method of claim 1, further comprising displaying a menu button while only one of the first and second windows is displayed, wherein the first menu list is displayed in response to a touch input applied to the menu button.

4. The method of claim 3, wherein the same menu button is displayed when the first window is displayed, when the second window is displayed, and when the third window is displayed.

5. The method of claim 1, wherein the first plurality of messages and the second plurality of messages of the merged content are displayed on the first window according to the order of communication with the first entity or the second entity such that one of the first plurality of messages is listed between two of the second plurality of messages or one of the second plurality of message is listed between two of the first plurality of messages.

6. The method of claim 1, wherein the first communication session and the second communication session remain active while the third communication session is executed.

7. The method of claim 1, wherein the first communication session comprises a messenger and the second communication session comprises an instant messaging (IM) service.

8. The method of claim 1, wherein the first communication session comprises a messenger or an instant messaging (IM) service, and the second communication session comprises an SMS (Short Message Service) or MMS (Multimedia Message Service).

9. The method of claim 1, wherein the merging of the first content and the second content is restricted by at least a number of the plurality of entities or a total amount of conversation content in the first and second communication sessions such that the first and second communication sessions cannot be merged when the number of the plurality of entities is greater than a preset number or the total amount of conversation content is greater than a preset amount, the total amount determined by a number of characters or a length of lines in the conversation content.

10. The method of claim 1, wherein the first entity and the second entity are not allowed to communicate with each other while the merged content is displayed on the first window.

11. The method of claim 1, further comprising:
selecting the first or second communication session to receive a message for transmission to the first entity or the second entity; and
displaying content of the selected communication session distinguishably from content of an unselected communication session on the first window on which the merged content is displayed.

12. The method of claim 1, further comprising:
selecting the second communication session to receive a message for transmission to the second entity while the merged content is displayed on the first window; and
no longer displaying the first content of the first communication session on the first window when the second communication is selected.

13. The method of claim 1, further comprising:
displaying a soft button on the first window on which the merged content is displayed for receiving an input for selecting the first communication session or the second communication session; and
receiving a message for transmission to the first entity or the second entity according to the first or second communication session selected in response to the second input.

14. The method of claim 13, further comprising displaying the soft button differently in response to the input to indicate the selected first or second communication session.

15. The method of claim 13, wherein the soft button is displayed in a first color when the first communication session is selected and displayed in a second color when the second communication session is selected.

16. The method of claim 1, further comprising:
selecting a specific entity to which a message received via a message input window is to be transmitted, the specific entity selected in response to an input received via the first window on which the merged content is displayed,
wherein the input comprises a first touch input directed to the specific entity displayed on the first window on which the merged content is displayed and a second touch input directed to the message input window displayed on a portion of the first window on which the merged content is displayed.

17. The method of claim 16, wherein the input further comprises touching the specific entity and dragging the specific entity into the message input window such that the message is automatically transmitted to the selected specific entity.

18. The method of claim 1, further comprising:
receiving a message for transmission via a message input window displayed on a portion of the first window on which the merged content is displayed; and
automatically transmitting the message to a specific entity when the received message is dragged from the message input window to the specific entity displayed on the first window on which the merged content is displayed.

19. A mobile terminal, comprising:
a wireless communication unit configured to establish a first communication session with a first entity and to establish a second communication session with a second entity;
a display; and
a controller configured to:
cause the display to display first content communicated with the first entity on a first window generated when the first communication session is established;
cause the display to display second content communicated with the second entity on a second window generated when the second communication session is established;
cause the display to display a first menu list comprising a first menu item and a second menu item when the first or second window is displayed;
perform a window merging in response to selection of the first menu item from the first menu list to merge the second content comprising a second plurality of messages communicated with the second entity into the first content comprising a first plurality of messages communicated with the first entity such that a first identifier corresponding to the first entity and a second identifier corresponding to the second entity are displayed concurrently in different appearances on the first window, wherein the first communication session and the second communication session are independently executed such that the first entity and the second entity cannot communicate with each other via the first or second communication session while the merged content is displayed on the first window after performing the window merging; and perform a session merging in response to selection of the second menu item from the first menu list to merge the first communication session and the second communication session into a third communication session, the third communication session displayed on a third window including the first identifier and the second identifier that are displayed concurrently in a same appearance, wherein:

the first entity and second entity can communicate with each other via the third communication session; and while the first communication session and the second communication session are performed independently in real-time, and the first content and the second content are displayed concurrently on the first window, a display order of the first content and the second content is changeable according to setting from a second menu list such that:

when a first preset display order is set from the second menu list, the first content and the second content are displayed on the first window according to an order of communication with the first entity or the second entity such that a first plurality of messages of the first content and a second plurality of messages of the second content are alternately displayable; and when a second preset display order is set from the second menu list, the entire first content is displayed on the first window prior to or following the entire second content displayed on the first window such that none of the first plurality of messages is displayed between two of the second plurality of messages or none of the second plurality of messages is displayed between two of the first plurality of messages.

20. The mobile terminal of claim 19, wherein the controller is further configured to:

cause the display to re-display the first content on the first window, the second content not displayed on the first window, and to re-display the second content on the second window, the first content not displayed on the second window, in response to a touch input applied to a menu button that is displayed while the merged content is displayed on the first window, wherein the menu button is also displayed when the first window including the first content is re-displayed or when the second windows including the second content is re-displayed.

21. The mobile terminal of claim 19, wherein the controller is further configured to cause the display to display a menu button while only one of the first and second windows is displayed, wherein the first menu list is displayed in response to a touch input applied to the menu button.

22. The mobile terminal of claim 21, wherein the same menu button is displayed when the first window is displayed, when the second window is displayed, and when the third window is displayed.

23. The mobile terminal of claim 19, wherein the first plurality of messages and the second plurality of messages of the merged content are displayed on the first window according to the order of communication with the first entity or the second entity such that one of the first plurality of messages is listed between two of the second plurality of messages or one of the second plurality of message is listed between two of the first plurality of messages.

24. The mobile terminal of claim 19, wherein the first communication session and the second communication session remain active while the third communication session is executed.

25. The mobile terminal of claim 19, wherein the first communication session comprises a messenger and the second communication session comprises an instant messaging (IM) service.

26. The mobile terminal of claim 19, wherein the first communication session comprises a messenger or an instant messaging (IM) service, and the second communication session comprises an SMS (Short Message Service) or MMS (Multimedia Message Service).

27. The mobile terminal of claim 21, wherein the controller is further configured to restrict the merging of the first content and the second content based upon at least a number of a plurality of entities or a total amount of conversation content in the first and second communication sessions such that the first and second communication sessions cannot be merged when the number of the plurality of entities is greater than a preset number or the total amount of the conversation content is greater than a preset amount, the total amount determined by a number of characters or a length of lines in the conversation content.

28. The mobile terminal of claim 19, wherein the first entity and the second entity are not allowed to communicate with each other while the merged content is displayed on the first window.

29. The mobile terminal of claim 19, wherein the controller is further configured to:

select the first or second communication session to receive a message for transmission to the first entity or the second entity; and control the display to display content of the selected communication session distinguishably from content of an unselected communication session on the first window on which the merged content is displayed.

30. The mobile terminal of claim 19, wherein the controller is further configured to:

select the second communication session to receive a message for transmission to the second entity while the merged content is displayed on the first window; and cause the display to no longer display the first content of the first communication session on the first window when the second communication session is selected.

31. The mobile terminal of claim 19, wherein the controller is further configured to:

cause the display to display a soft button on the first window on which the merged content is displayed for receiving an input for selecting the first communication session or the second communication session; and receive a message for transmission to the first entity or the second entity according to the first or second communication session selected in response to the second input.

32. The mobile terminal of claim 31, wherein the controller is further configured to cause the display to display the soft button differently in response to the input to indicate the selected first or second communication session.

33. The mobile terminal of claim 31, wherein the controller is further configured to cause the display to display the soft button in a first color when the first communication session is selected and display the soft button in a second color when the second communication session is selected.

34. The mobile terminal of claim 19, wherein the controller is further configured to select a specific entity to which a message received via a message input window is to be transmitted, on the specific entity selected in response to an input received via the first window on which the merged content is displayed, the input comprising a first touch input directed to the specific entity displayed on the first window on which the merged content is displayed and a second touch input directed to the message input window displayed on a portion of the first window on which the merged content is displayed.

35. The mobile terminal of claim 34, wherein the input further comprises touching the specific entity and dragging the specific entity into the message input window such that the message is automatically transmitted to the selected specific entity.

36. The mobile terminal of claim 19, wherein the controller is further configured to:
   receive a message for transmission via a message input window displayed on a portion of the first window on which the merged content is displayed; and
   cause the wireless communication unit to transmit the message automatically to a specific entity when the received message is dragged from the message input window to the specific entity displayed on the first window on which the merged content is displayed.

* * * * *